RECORD PLAYER USING LIGHT TRANSDUCER AND SERVO

Filed June 6, 1961 2 Sheets-Sheet 1

INVENTORS
Jacob Rabinow &
Arthur O. Morse
BY Joseph A. Genovese &
Max L. Libman
Attorneys

RECORD PLAYER USING LIGHT TRANSDUCER AND SERVO

Filed June 6, 1961 2 Sheets-Sheet 2

INVENTOR.
Jacob Rabinow
Arthur O. Morse
BY Joseph A. Genovese &
Max L. Libman
Attorneys

3,138,669
RECORD PLAYER USING LIGHT TRANSDUCER AND SERVO

Jacob Rabinow, Takoma Park, and Arthur O. Morse, Kensington, Md., assignors, by mesne assignments, to Jacob Rabinow, Bethesda, Md.

Filed June 6, 1961, Ser. No. 115,253
16 Claims. (Cl. 179—100.4)

This invention relates to audio systems and more particularly to record players using light transducers.

The concept of playing records by using a beam of light to follow the record groove is quite old. For example, R. Friebus discloses such a system in U.S. Patent No. 1,891,227, and the same holds true for W. Williams, Patent No. 1,917,003, and J. Hammond, Patent No. 1,967,882. As far as the light transducer features of these patents are concerned, they are philosophically similar to each other and to the R. Friebus Patent 1,916,973. Each relies on the projection of a light beam from a source and the use of light reflected from the record groove, modulated with information which varies in accordance with the sound track of the record.

Paradoxically, the prior art states that one of the primary advantages of the light transducer is that the record groove is untouched, eliminating the possibility of wear and damage from a needle. Yet, the earlier Friebus patent discloses a guiding stylus in the record groove and Hammond in certain embodiments discloses the same thing. It is true that the guiding stylus is not in the same part of the groove from which information is obtained by the light transducer but still, the stylus will wear the record groove. There is always the possibility that the follower stylus will produce all of the deleterious effects on the record that a transducer needle will produce.

The later Friebus patent seems to ignore the necessity of having the light spot track the record groove whereas some embodiments of Hammond rely on mechanisms to track a groove in the bottom of the record.

An objective of our invention is to provide a record player using a transducer relying on a concentration of electro-magnetic energy, such as a spot of light, where the light spot is servoed to the groove of the record without any mechanical contact whatsoever with the record, its groove or a template emulating the groove of a record as in Patent No. 1,967,882.

More specifically, we have produced a system using the light beam itself as a servo triggering device to require the light spot to follow the groove of the record, while it is being modulated with the intelligence of the record groove.

Another object of the invention is to provide an audio system which makes it possible to play sound recordings including monaural and stereo without physical contact with the record groove or a record groove substitute. One significance of this is that an ordinary record may be played for enjoyment, test, reproduction, etc. through a transparent protective envelope on the record. Collectors items and masterpieces may be hermetically sealed within a transparent envelope and yet be played by using our audio system.

The prior art systems requiring record-groove contact are incapable of achieving this advantage, and those prior art disclosures which use other portions of a record as guiding devices are subject to similar limitations, and introduce collateral mechanical problems.

Prior light transducers obtain information from the record in several ways. R. Friebus 1,916,973 projects the light beam onto one side of the groove. W. Williams uses a lens system and an apertured diaphragm to modulate the light reflected from the entire cross section of the groove. We have a completely different method (as mentioned below) of obtaining information from the record groove, even though we use a spot of light.

Accordingly, another object of the invention is to provide a sound reproduction system for record playing, which employs a spot of light sweeping back and forth across a record groove to detect the intelligence of the groove i.e. its configuration. The distinction is that we scan or sweep across the groove, whereas prior systems require the light spot to follow the groove.

A further objective of our invention is to rely on the sweeping of the spot i.e. its excursions, to maintain the spot servoed to the groove.

Other objects and features of importance will become apparent in following the description of the illustrated forms of the invention. The illustrations and ensuing descriptive material are given by way of example only and are not to be interpreted as the only mode of practicing the invention.

Figure 3A:
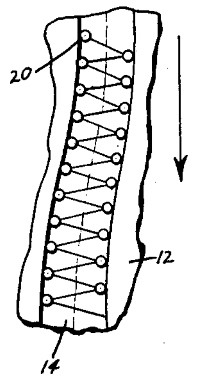
FIGURE 3 is an enlarged fragmentary sectional view taken on line 3—3 of FIGURE 1 and showing a typical excursion of a spot of light as it sweeps across the groove.

FIGURE 3*a* is a fragmentary top view of the record groove, again showing the excursion of the spot as it sweeps across the groove.

Figure 4:
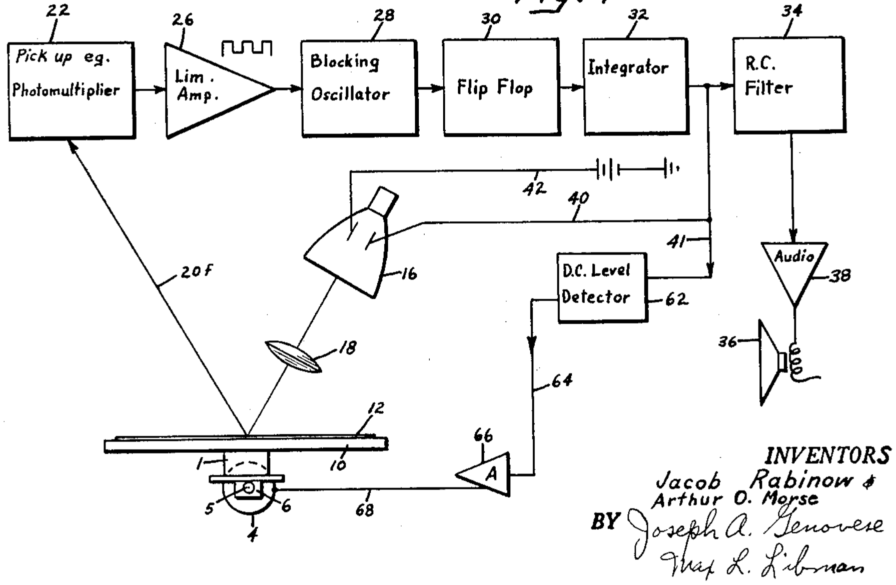

FIGURE 4 is a schematic block diagram showing one form of our system.

Figure 5:
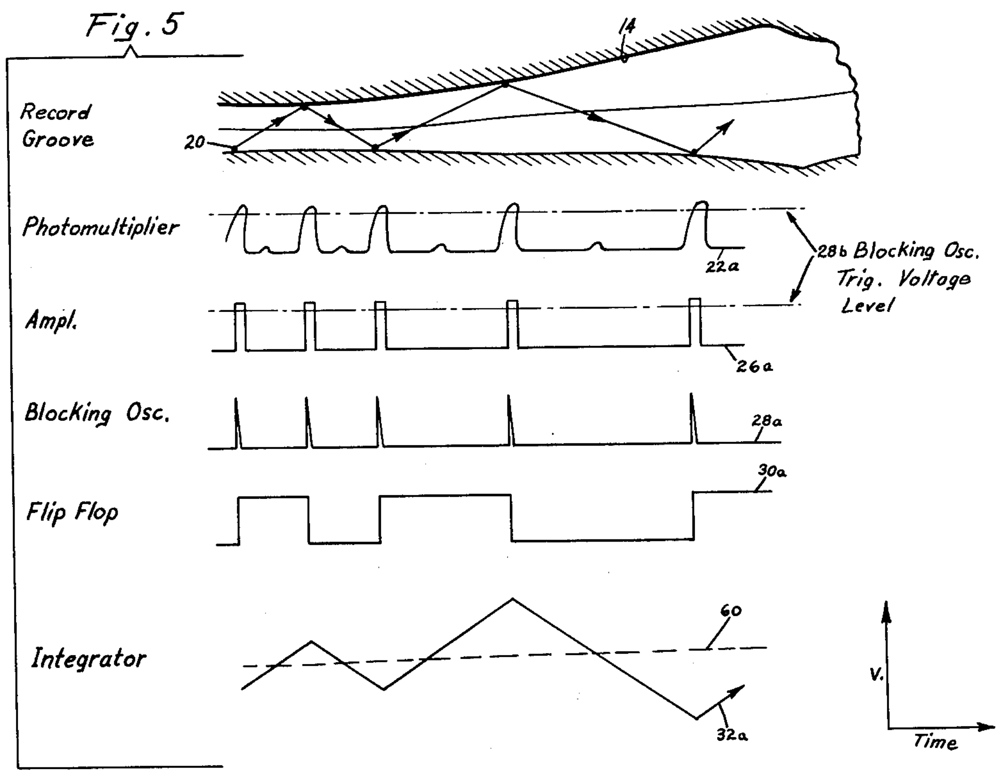

FIGURE 5 shows a group of curves explaining the functions and wave forms of the system in FIGURE 4.

Figure 6:
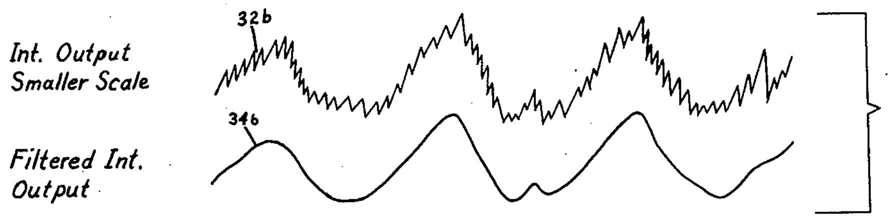

FIGURE 6 shows additional curves on a different scale from those in FIGURE 5.

Figure 7:
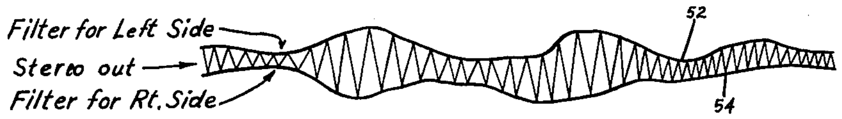

FIGURE 7 shows a wave form of the audio output signal of our system when it is used for playback of stereo records.

Figure 1:
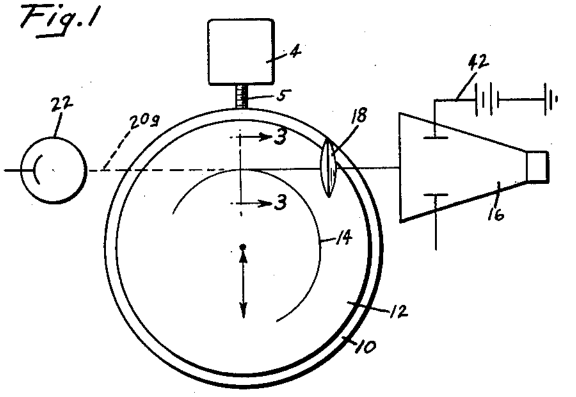
FIGURE 1 is a top schematic view of one possible light transducer system for practicing the invention.
Figure 2:
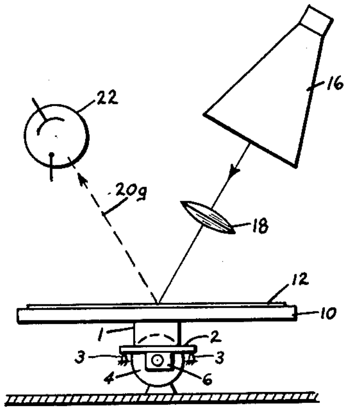
FIGURE 2 is a side view of the transducer system of FIGURE 1.

FIGURES 1–2 show an ordinary turntable 10 supporting a conventional record 12 having a lateral-cut record groove 14 (FIGURES 3 and 3*a*), although variations of our invention apply to other types of grooves, e.g. hill-and-dale. A source 16 of light is arranged to project the light beam on the surface of record 12 through a lens 18. The light beam is tangent to the part of the groove 14 on which the spot 20 (FIGURES 3 and 3*a*) is concentrated. Assume that the record 12 is horizontal, then the beam of light and its spot 20 will be essentially in a vertical plane. When viewed from the side (FIGURE 2) the beam of light is at an angle to the plane of the record 12. The exact geometry is not essential, but our system operates effectively in this way.

Light source 16 is shown as a cathode ray tube with a low persistence screen so that the decay rate is high. The cathode ray tube 16 has deflection plates and circuits (described later) to deflect the light beam.

Figure 3:
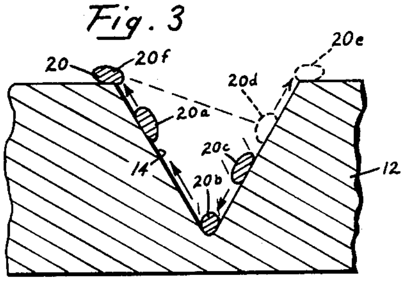

FIGURE 2 shows a photosensitive pick-up device 22, for example a photomultiplier. It is mounted in the plane of the light beam so that it receives light reflected from the record 12. FIGURES 3 and 3*a* show the sweeping of light spot 20 across the groove 14 while the turntable-supported record 12 is in motion. Keeping in mind the geometrical relationship of the light beam, the pick-up device 22 and the portion of the groove being scanned, it will become evident that when the spot of light is in positions 20*a*–20*d* (FIGURE 3) the light will be reflected by the groove walls and will not fall on pick-up device 22. However, when the light approaches and/or actually reaches the lands of the record positions at 20*f* and 20*e* (FIGURE 3) the light beam will have achieved a position at which the spot 20 at positions 20*f* and 20*e* will be reflected upwardly along the dotted line 20g (FIGURES 1 and 2) and fall upon the photomultiplier 22. When the photomultiplier sees the reflected light from the spot at position 20f (FIGURE 3) this information is used to change the direction of movement of the spot toward the opposite side of the groove 14. When the photomultiplier sees the reflected light from position 20e, this information is used to sweep the light back again, and this is how we servo the light spot to the groove regardless of the shape of the groove of the record. Furthermore, we use this same information to (a) servo the light beam to the record groove and (b) develop audio signals. Precisely how the audio signals are developed is best understood by referring to FIGURES 4–6.

FIGURE 4 is a block diagram starting with the pick-up 22 which has already been described. The output of the pick-up is fed to a saturable limiting amplifier 26. A fragment of groove 14 and a typical excursion of spot 20 is shown in FIGURE 5, but on greatly expanded scale. Curve 22a represents the output of the photomultiplier for the excursions of spot 20 in groove 14 (FIGURE 5). Starting at the left end of curve 22a, it rises to a peak which would be the case when the spot is at position 20f of FIGURE 3. Then, as the spot returns to the opposite side of the groove the curve falls because the photomultiplier sees less and less light. A slight rise is encountered at the bottom of the groove (position 20b of FIGURE 3) because a slight amount of light is reflected from the bottom of the groove to pick up 22 as the spot sweeps across it. As the spot approaches position 20e and actually achieves it, the curve rises to another peak. Notice that the width of the groove is reflected as time modulations of curve 22a, i.e. the peaks are spaced a distance proportional to the width of the groove. The amplifier output is represented by curve 26a and since the amplifier is a saturable limiting amplifier, the output pulses are square.

The next component in FIGURE 4 is a conventional blocking oscillator 28 whose output is triggered on the positive going sides of the pulses of curve 26a at a predetermined voltage level 28b. Curve 28a shows the output of the blocking oscillator which is fed to flip flop 30 or an equivalent bi-stable device such as a multivibrator which is turned on and turned off by electronic digital switching. Curve 30a shows the output of the flip flop 30, and this is fed to an integrator 32 which is also a standard component. The integrator simply integrates the voltage represented by curve 30a and produces an output waveform 32a.

The output of integrator 32 is fed to an RC filter 34, and the filtered integrator output is applied to a speaker 36 by way of an audio amplifier 38. It must be remembered that curve 32a is shown greatly expanded, just as the excursion of the light spot 20 in groove 14 of FIGURE 5. The integrator output would appear more like curve 32b (FIGURE 6). For monaural records we use the filtered output which would appear as a curve somewhat like curve 34b (FIGURE 6) for the integrator output signal 32b.

The sweep signal is obtained by conductor 40 connecting the integrator output to one deflection plate of the cathode ray tube 16. The other plate may be biased to ground by a battery circuit 42 or its equivalent. Viewing the integrated output on expanded scale, note that the deflection voltage is actually the same as the audio signal therefore the spot is deflected back and forth against the bias on the cathode ray tube in an amount proportional to the modulations of curve 32a.

We have described our system principally in terms of monaural records of any speed. More or less special records may be used by relying on methods, equipment and procedure which will become obvious upon an understanding of the monaural system. For example, stereo records may be played with our system. Instead of using the filtered integrated output (wave shape 34b) to drive an audio amplifier, it is evident that we may use the envelope boundaries of a wave form. The integrator output represented as wave form (FIGURE 7) may be obtained from the groove of a stereo recording, but instead of using RC filter 34, it may be fed to minimum and maximum peak detectors to produce what amounts to the equivalent of filtered wave shapes 52 and 54 (FIGURE 7). The wave form 52 would be contained along the upper envelope boundary and would represent, for instance, the left side of a stereo record groove. The same applies for wave form 54, however it would contain information of the opposite side of the record groove. These wave forms would then be amplified and applied to the voice coils of two or more speakers.

The usual, conventional record player has a pivotally mounted tone arm which gradually moves toward the center of the record as the record is being played. The needle tracking in the record groove automatically provides for the tracking movement of the arm. The prior patent disclosures, of which we are aware, relay on mechanical coupling with the record groove, or make no mention of the arm-to-record groove tracking problem. We use the same means for tracking the record groove in our monaural or stereo systems.

One way to require the light beam to track the spiral groove is to move the turntable 10, preferably with its motor 1 (FIGURES 2 and 4) and associated turntable-drive mechanism (not shown). In this form of tracking we attach the motor 1 to a carriage 2, and mount the carriage on tracks 3. Tracking motor 4 is drivingly connected to carriage 2, e.g. by means of screw 5 connected to the shaft of motor 4 and engaged with nut 6 fixed to carriage 2. Alternatively, a screw-switching system like that in the Rabinow Patent No. 2,915,315 can be used to translate the turntable 10.

An important feature of our system is in the way we energize the motor 4 so that it moves the record at a speed sufficient to have the light beam (and its spot 20) track the spiral record groove. Considering the integrator output 32a (FIGURE 5), the points at which it changes direction correspond to the changes in direction of the spot 20 of light (FIGURE 4). These points of curve 32a may be considered as A.C. information, and the median line therebetween the D.C. reference 60. Thus, the D.C. reference will correspond to the spiral shape of the record groove. In other words, if the peaks of curve 32a correspond to the lands of the record alongside of a groove, the median line drawn between successive adjacent pairs of peaks will represent the center of the groove, and a signal corresponding thereto, i.e. the D.C. reference of the integrator output, is available to operate motor 4. Note that as the record groove spiral becomes smaller and smaller (during the playing of the record), the D.C. reference level also shifts.

D.C. level detector 62 (FIGURE 4) is connected to the integrator output line 40 by way of line 41 to detect the D.C. level of the integrator output. The output line 64 of detector 62 is connected to amplifier 66 whose output line 68 is connected to motor 4. This arrangement causes the motor 4 to operate and hence, the turntable with its record to shift to maintain it in such position at all times while the record is playing, so that the light beam tracks the record groove.

Another way of tracking the record groove is to use an additional integrator (not shown) for the bias voltage of circuit 42 and the output of integrator 32. The additional integrator would provide an output signal corresponding to the previously described D.C. reference which can be used to operate motor 4.

Although we have shown and described several forms of our invention it is to be clearly understood that various changes, modifications and other alterations may be made without departing from the invention. Accordingly, limitations imposed should be only as required by the prior art.

We claim:

1. A reproducing system for a grooved record wherein the record is essentially flat and the groove is a spiral in the face of the record, means providing a beam of light at an angle to the plane of the record for producing a spot on the record, said beam being in a plane which is normal to the record and tangent to the groove, means for sweeping said light back and forth between opposite lands of the groove, and a light sensitive pick-up device positioned to receive light reflected from the record, and owing to the relative position of the record groove and spot of light and direction of sweep thereof the spot of light on the record produces essentially no significant reflections to said pick-up device when the spot of light is in the lower wall region of the groove, and the pick-up device gathers significant light when the spot reaches the lands of the groove.

2. A reproducing system for a grooved record wherein in the record is essentially flat and the groove is a reasonably tight spiral in the face of the records, a photosensitive pick-up device, means for producing a beam of light at an angle to the plane of the record whereby the spot of light produces essentially no reflections to said pick-up device when the spot of light is in the lower part of the groove and where the pick-up device gathers significant reflected light when the spot approaches or reaches the lands of the groove, and means triggered by outputs of the pick-up device occuring alternatively when the spot of light approaches or reaches lands at opposite sides of the groove for deflecting the beam back and forth across the groove.

3. A reproducing system for the groove of a record wherein the record is essentially flat; means for producing a beam of light at an angle to the plane of the record, said beam producing a spot on the record, and said beam located in a plane normal to the record and tangent to the groove at the point where the spot falls into the groove; a light sensitive pick-up device positioned to receive light reflected from the record whereby the spot of light produces essentially no flections to said pick-up device when the spot of light is in the lower part of the groove and where the pick-up device gathers significant light when the spot approaches or reaches the lands of the groove; means triggered by outputs of the pick-up device occurring alternatively when the spot of light approaches or reaches lands at opposite sides of the groove for deflecting the beam back and forth across the groove; and means sensitive to the said outputs for producing an audio signal.

4. Sound reproducing apparatus for a grooved record comprising means including a light source producing a light beam on the record surface, a pick-up device sensitive to light reflected from the record surface, an amplifier fed by the output of said pick-up device, means triggered by the output of said amplifier to produce modulated output signals, bi-stable means operated by said output signals to provide signals corresponding to the modulations of said modulated signals, and an integrator for the output signals of said bi-stable means and producing a further signal adapted to drive a transducer.

5. Sound reproducing apparatus for a grooved record comprising a light source producing a light beam which forms a spot on the record surface, a pick-up device sensitive to light reflected from spot on the record surface, an amplifier fed by the output of said pick-up device, means triggered by the output of said amplifier to produce time modulated output pulses, bi-stable means operated by said output pulses to provide digital signals of pulse lengths corresponding to said modulated pulses, an integrator connected with said bi-stable means for producing an audio signal adapted to drive an acoustic transducer, and means sensitive to a signal which is a function of the output of said pick-up device for sweeping the beam across the record groove in a back and forth motion to detect the relative positions of the sides of the groove from which said audio signal is ultimately derived.

6. The apparatus of claim 5 and means also responsive to said audio signal for requiring the light beam-record groove tracking to be maintained.

7. In a record player for an opaque record having a groove in one surface with lands on opposite sides of the groove, the improvement comprising a sound reproducing system including a light source beam providing a spot of light on the record surface, means directing said beam at an angle to the plane of said surface and into said groove, a light sensitive pickup device located to receive light reflected from said lands on opposite sides of said groove and to provide output signals each time that the light spot impinges on one of said lands, means responsive to said signals to provide new signals, means responsive to said new signals for sweeping said light beam back and forth between lands on the opposite sides of said groove so that the reversals of said beam correspond to the audio information of said groove, and means also responsive to said new signals for providing an audio signal corresponding to said output signals.

8. The subject matter of claim 7 and means responsive to said new signals for providing a servo signal, and means responsive to said servo signal for requiring said beam spot to track said groove.

9. In a sound reproducing system for playing back intelligence recorded in a spiral groove in the surface of a completely opaque record where the record has lands on opposite sides of the groove; means for directing a spot of light on the record at an angle to said surface, a light sensitive pickup device arranged to receive light reflected from said surface in the region of said lands and provide output signals corresponding to said reflected light, means for sweeping said spot of light back and forth across said groove, said spot-sweeping means responsive to said output signals to change the direction of sweep motion of said spot each time that said pickup device provides an output signal, and further means responsive to said output signals for providing audio signals modulated in accordance with said output signals.

10. The sound reproducing system of claim 9 wherein said further means include means for providing separate audio signals corresponding to recorded information of opposite sides of said groove for stereo sound reproduction.

11. In a phonograph record playing system to reproduce the audio recorded by the groove of a phonograph record wherein the record has lands on opposite sides of said groove, the combination of a light source providing a light beam, means to focus said beam as a spot in said groove, photosensitive means arranged to receive the light of said spot which is reflected from said groove and provide an electrical output corresponding thereto, means responsive to said electrical output for providing a sweep signal to sweep said spot back and forth across said groove from one land to the opposite land, and means responsive to said sweep signal for providing an audio signal corresponding to the sweep direction changes as said spot is moved from one land to the opposite land.

12. The system of claim 11 and means to servo said beam to said groove to require said spot to continually track said groove.

13. In a sound reproducing system for a record having a spiral groove in one face thereof, said surface having lands on opposite sides of the groove, means including a turntable to rotate the record in a first plane, a light source providing a beam of light at an angle to said plane and tangent to said spiral groove, means in the path of said beam to form a light spot in said spiral groove, a photocell arranged to intercept light reflected from said surface and provide output signals corresponding thereto, said photocell intercepting substantially no reflected light when said spot is in said groove and significant light when said spot is on said lands, means for sweeping said beam back and forth so that said spot moves transversely across said groove from land-to-land, said sweeping means including electrical means to change the direction of sweeping movement each time that a land is reached by said spot and light is reflected therefrom to said photocell, means responsive to said photocell signals for providing a signal which is modulated each time that said sweeping direction is changed so that said modulated signal corresponds to the recorded audio of said record groove, means to integrate said modulated signal to provide an audio output signal, and means connected with the output of said integrator for requiring said spot and groove to maintain a tracking relationship to each other.

14. The system of claim 13 where the last mentioned means include a level detector.

15. In a system to play a record that has a spiral groove with lands on opposite sides of the groove, means to direct a spot of light at an angle to the surface of the record and tangent to the groove, photosensitive means having a receiving surface at the angle of light reflection from said surface, means to sweep said light spot back and forth across the groove so that when said spot is at said lands, light is reflected to said receiving surface of said photosensitive means and when said spot is in the groove the light is so reflected by the walls of the groove that the reflected light fails to impinge on said receiving surface, means responsive to the outputs of said photosensitive means caused by reflected light impinging on said receiving surface for providing signals, means responsive to said signals for controlling said sweeping means to change the direction of sweep movement of said spot, and means also responsive to said photosensitive means outputs for providing an audio signal which is modulated in accordance with changes in direction of sweep movement of said light spot.

16. The system of claim 11 wherein said phonograph record is a stereo record, and said means responsive to said sweep signal provide separate audio signals corresponding to recorded audio information of the respective sides of the record groove.

References Cited in the file of this patent

UNITED STATES PATENTS

| | | |
|---|---|---|
| 1,916,973 | Friebus | July 4, 1933 |
| 2,462,263 | Haynes | Feb. 22, 1949 |
| 2,654,810 | Miessner | Oct. 6, 1953 |
| 2,851,521 | Clapp | Sept. 9, 1958 |